United States Patent Office 3,240,804
Patented Mar. 15, 1966

3,240,804
DECOLORIZATION OF AQUEOUS SOLUTIONS OF PHTHALIC ACIDS UTILIZING DEMETALLIZED ACTIVATED CARBON
James O. Knobloch, Hobart, and Russell V. Malo, Munster, Ind., assignors to Standard Oil Company, Chicago, Ill., a corporation of Indiana
No Drawing. Original application June 27, 1960, Ser. No. 38,704, now Patent No. 3,168,485. Divided and this application May 14, 1964, Ser. No. 367,544
4 Claims. (Cl. 260—525)

This application is a division of our application Serial No. 38,704, filed June 27, 1960, and now U.S. Patent No. 3,168,485.

This invention relates to the removal of metals from activated carbon and more particularly pertains to the removal of iron from activated carbon. This invention also pertains to the decolorizing of aqueous solutions of phthalic acids by contacting said aqueous solutions with activated carbon whose iron content has been reduced by the process herein described.

Activated carbons have been employed for decolorizing organic chemical compounds. Various techniques have been employed; for example, where the organic compound to be decolorized is a liquid, the liquid is contacted with activated carbon by mixing the liquid with activated carbon at ambient temperature or at elevated temperatures and removing the activated carbon from the treated liquid. The liquid organic compound has also been passed through a bed of activated carbon to decolorize the liquid. Where the organic compound to be decolorized is a solid, it is generally converted to a liquid such as a melt or taken up in a solvent or a combination of solvents and the resulting liquid treated with activated carbon either by admixing the liquid with activated carbon and thereafter recovering the liquid, for example by filtration, or the liquid is percolated through a bed of activated carbon.

Activated carbons for decolorization are obtained from many carbonaceous sources, for example from sawdust, kelp, wood pulp, coal, peat, wood charcoals, nut shells, bones, fruit pits, among other sources. Such charcoals or carbons are activated in numerous ways. Activated carbons of extremely low metals content are in general the most expensive of the activated carbons and only find small volume use in highly specialized processes. The activated carbons which are used in large volumes in commercial chemical processes for decolorizing chemical products are frequently used on a once-through basis and are then discarded. Such activated carbons have a relatively high metals content and are in general useful without much regard to the metals content. However, for the purification and decolorization of some chemical compounds the presence of certain metals in the activated carbon increases the color of the product being purified rather than decreasing its color. The presence of relatively large amounts of iron in activated carbons in general is the contributor to the additional color of the organic compound to be decolorized and/or purified. Because of their greatly increased cost, the use of activated carbons low in iron, as well as other metals, is not economically attractive for many commercial processes. There is, therefore, a need for a convenient and inexpensive method for removing from activated carbons metals, especially iron.

Activated or color absorbent carbons are prepared by the high temperature carbonization or activation of various carbonaceous materials, which, for the purpose of improving absorptive capacity of the carbons, are impregnated with (or may initially contain) certain metal compounds. Such metals as zinc, manganese, calcium, magnesium, iron, potassium, sodium as their chlorides, sulfates, phosphates, oxides and hydroxides are added before or after one or more pyrolytic treatments of the original carbonaceous materials for the preparation of activated carbons.

It has been found that it is advantageous to decolorize aqueous solutions of phthalic acids by contacting such solutions with activated carbon. For example, aqueous solutions saturated with impure orthophthalic acid have a tendency to resist the formation of orthophthalic acid crystals because of the presence of certain highly colored impurities. However, when such a solution is passed through or contacted with activated carbon and these colored impurities are removed, the crystallization of orthophthalic acid from decolorized solutions proceeds in a normal manner. However, if an aqueous solution of orthophthalic acid is contacted with an activated carbon of high iron content, the orthophthalic acid instead of being decolorized picks up a substantial amount of the iron and has a much higher color than before treated.

We have discovered a process for very markedly reducing the metals content, especially the iron content, of activated carbons. Our process comprises contacting the activated carbon with a solution of a benzene polycarboxylic acid in a polar solvent. By contacting we mean either slurrying the activated carbon with the solution of the benzene polycarboxylic acid or passing the solution through a bed of activated carbon or flooding a bed of activated carbon with a stagnant solution of the benzene polycarboxylic acid. This process can be carried out at a temperature of from ambient temperature up to about 500° F., desirably in the range of from 50 to 450° F. When water is the solvent, the temperature is desirably in the range of 100 to 450° F. and preferably 300 to 400° F. It will be appreciated that as the treating temperature is increased a greater amount of benzene polycarboxylic acid can be retained in solution, and, therefore, for a given amount of solution a higher efficiency of metal removal can be obtained. It is for this reason that the desired and preferred higher temperatures are employed. When the process is carried out at temperatures above the boiling point of the solvent, it will, of course, be necessary to employ superatmospheric pressure to maintain the solvent in a liquid phase. The minimum pressure for any selected temperature above the boiling point of the solvent will be then that pressure which will maintain the solvent in a liquid phase. This is not to say that all the solvent need be in liquid phase, for the activated carbon can be treated according to the process of this invention with a boiling solution of the benzene polycarboxylic acid as will hereinafter be illustrated.

When it is first appreciated carbons of high metal content and esepcially high iron content increase the color of the dissolved material in the solution to be decolorized, it would be thought that the pretreatment of the activated carbon with any relatively strong acid should remove he metals and that the efficiency of metal removal would be dependent on the strength of the acid material employed. We have discovered, however, that this is not the case at all, especially with respect to the removal of iron from activated carbon. We have found that the relatively strong mineral acids remove only a very small amount of iron from activated carbon whereas solutions of phthalic acids, trimellitic acid and other benzene polycarboxylic acids whose first hydrogen ionization constant is in the range of only 0.01 to 0.03 times that of the ionization constant of such much stronger acids as hydrochloric and nitric acids will remove more than 80% of the iron from activated carbon. It might also be though that the weaker acidic materials might in general be better able to remove iron from activated carbons. However, this is also not the case, for benzoic acid, acetic acid and phenol, all of whose ionization constants are much lower than the above-mentioned benzene polycarboxylic acids, are no better than such mineral acids as hydrochloric and nitric acids. This interesting and unusual phenomenon is illustrated in Table I hereinafter appearing, wherein on a comparable basis the maximum percent of iron removal from an activated carbon is shown for various organic acidic compounds. The acid strength of the acidic compounds is designated by their ionization constant at 25° C. in water, this ionization constant for the benzene polycarboxylic acids being the ionization constant of the first hydrogen.

TABLE I

| Extracting Acid | Ionization constant (25° C.) | Maximum percent iron removal |
|---|---|---|
| Hydrochloric acid | $>10^{-1}$ | 21.0 |
| Nitric acid | $>10^{-1}$ | 4.0 |
| Orthophthalic acid ($K_1$) | $1.3 \times 10^{-3}$ | 95.7 |
| Terephthalic acid ($K_1$) | $3.1 \times 10^{-4}$ | } 84.0 |
| Isophthalic acid ($K_1$) | $2.9 \times 10^{-4}$ | |
| Benzoic acid | $6.6 \times 10^{-5}$ | 15.4 |
| Acetic acid | $1.86 \times 10^{-5}$ | 36.5 |
| Phenol | $1.3 \times 10^{-10}$ | 11.5 |

The ionization constants for trimellitic acid at 25° C. are: ($K_1$) $3.01 \times 10^{-3}$, ($K_2$) $1.45 \times 10^{-4}$ and ($K_3$) $6.3 \times 10^{-6}$.

The data in Table I show that the benzene polycarboxylic acids are outstandingly superior in the removal of iron from activated carbon and that very strong acids such as hydrochloric and nitric acids are exceptionally poor as are such acidic compounds as benzoic acid, acetic acid and phenol.

The importance of iron removal from activated carbon can be particularly illustrated when the carbon is to be employed to decolorize solutions of aromatic acids such as an aqueous solution of orthophthalic acid. We have found that when orthophthalic acid containing colored impurities and only 7.6 p.p.m. iron is dissolved in water and contacted with activated carbon, the residual color of the dissolved solids in the treated solution expressed as a percentage of the color of the original crude orthophthalic acid varies directly with the amount of iron extracted from the activated carbon. The point at which the disappearing organic color bodies balances the increasing color due to the dissolved iron appears to be in the range of 300 to 400 parts per million (p.p.m.) iron in the treated orthophthalic acid, for it is in this range that the treated aqueous solution of orthophthalic acid has the same color as the original untreated solution; i.e., the residual color is 100% of the original color. As the iron content of the treated orthophthalic acid increases, the percent residual color also increases; for example, when the iron content is 500 p.p.m., the residual color is in the range of 130 to 140%, when the iron content is 600 p.p.m., the residual color is in the range of 160 to 170% and at even higher iron content the residual color of the treated orthophthalic acid is even further increased than that indicated. As the iron content of the treated orthophthalic acid is reduced below the range of 300 to 400 p.p.m., the percent of residual color decreases rapidly; for example, at an iron content of 200 p.p.m. the percent residual color is in the range of 50 to 60%, at 100 p.p.m iron the residual color is in the range of 20 to 30% and at 50 p.p.m. the percent residual color is in the range of 10 to 15%. Similar increases and decreases in residual color of other organic acids such as isophthalic acid, terephthalic acid, benzoic acid, acetic acid, among others, will also occur with the varying iron content of the treated acids.

The iron content of the higher metals content activated carbons varies considerably from about 300 to 400 p.p.m. to as high as 6000 p.p.m. The amount of benzene polycarboxylic acid to be employed and the time of contact will, of course, then vary with the iron content of the activated carbon. However, if by following the techniques hereinafter described with respect to specific activated carbon of designated iron content the iron content of the activated carbon treated is not reduced to the desired concentration after a first treatment, the process of this invention can be repeated with a fresh solution of benzene polycarboxylic acid. Whether more than one treatment is required can be readily determined by such convenient analytical procedures as subjecting the extracted activated carbon to spark spectra analysis. The selection of the ultimate iron concentration is a matter of judgment and depends not only on the economics involved but also the tolerable amount of iron with respect to the material to be decolorized.

Where the material to be decolorized is not the same as the benzene polycarboxylic acid used for removing metals, especially iron, from the activated carbon it will be advantageous to wash the activated carbon with solvent of low metals content to remove the absorbed, adhering or associated solution of benzene polycarboxylic acid from the treated activated carbon. However, when the activated carbon is to be employed to decolorize the same benzene polycarboxylic acid, such a washing step is not essential. In this case the first part of the solution to be decolorized is retained separately after contacting the activated carbon of lower metals content and used to treat the next quantity of activated carbon to be employed when the first quantity is spent with respect to color removal. Such spent activated carbon will be hereinafter referred to as "color spent" activated carbon.

To further illustrate the ineffectiveness of iron removal from activated carbon with acidic compounds other than benzene poycarboxylic acids, the following procedures are described in detail. In these procedures samples of the same activated carbon containing 5200 p.p.m. iron are employed. In each procedure a 10 gram sample of this activated carbon is slurried with the indicated acidic material at its boiling point and to keep the volume of acidic material substantially constant a reflux condenser was employed to return materials vaporized from the mixture. Following treatment at the specified time the slurry was filtered to recover the activated carbon. The treated activated carbon was washed with demineralized water and dried. The dried treated activated carbon was then analyzed by spark spectra analysis.

TABLE II

| Aqueous Acidic Solution | | | Carbon | | | Iron content | |
|---|---|---|---|---|---|---|---|
| Material | Concentration, percent | Quantity, cc. | Grams | Form | Time, hrs. | Residual (p.p.m.) | Percent Removed |
| Nitric acid | 15 | 100 | 10 | 12 x 40 | 1 | 5,000 | 4 |
| Versene | 6.6 | 100 | 10 | 12 x 40 | 1 | 3,900 | 25 |
| Hydrochloric acid | 15 | 100 | 10 | 12 x 40 | 1 | 4,100 | 21 |
| Do | 20.2 | 250 | 10 | 12 x 40 | 1 | 3,300 | 37 |
| Do | 20.2 | 250 | 10 | 12 x 40 | 2 | 3,000 | 42 |
| Do | 20.2 | 250 | 10 | 12 x 40 | 4 | 3,200 | 38 |
| Do | 20.2 | 250 | 10 | Powdered | 24 | 2,400 | 54 |
| Do | 20.2 | 250 | 10 | do | 48 | 2,500 | 52 |
| Do | 20.2 | 250 | 10 | do | 72 | 2,300 | 56 |
| Do | 20.2 | 250 | 10 | do | 96 | 2,200 | 58 |

The activated carbon form as indicated "12 x 40" is an activated carbon of the size distribution such that not more than 5% is larger than 12 mesh (U.S. sieve series) and not more than 5% passes through a 40 mesh screen. The powdered activated carbon was obtained by grinding in a mortar the 12 x 40 mesh activated carbon. The 20.2% hydrochloric acid was a constant boiling hydrochloric acid boiling at 110° C.

The data in Table II illustrate that changing the concentration of hydrochloric acid as well as the time of contact and even changing the particular size of the activated carbon did not produce the results obtainable by the process of this invention as hereinbefore forecast.

Additional comparative tests were conducted with powdered activated carbon obtained as described hereinbefore having an iron content of 5200 p.p.m. treated with aqueous solutions of several organic acidic materials. Again the suspensions of the powdered activated carbon were heated under reflux conditions for 60 to 80 minutes and filtered hot to recover the treated activated carbon. The recovered activated carbon was washed with hot demineralized water, dried and analyzed for iron by their spark spectra. These procedures are shown in greater detail in Table III.

TABLE III

| Organic acid | Benzoic acid | Phenol | Acetic acid |
| --- | --- | --- | --- |
| Weight (g.) | 10.0 | 15.0 | 16.4 |
| Water (ml.) | 150 | 150 | 150 |
| Reflux time (min.) | 62 | 75 | 80 |
| Fe in spent carbon (5,200 p.p.m. Fe before use) | 4,400 | 4,600 | 3,300 |
| Percent Fe removal | 15.4 | 11.5 | 36.5 |

The process of this invention is more specifically illustrated by the following examples.

*Example I*

A stainless steel column (1" diam. x 8 ft. was packed with 10 x 28 mesh activated carbon. Under pressure a solution of isophthalic and terephthalic acids (9 parts isophthalic acid to 1 part terephthalic acid) in water (4 lbs. acid/100 lbs. water) at 330° F. was passed through the carbon bed over a 24 hour period. At the end of this time the carbon had been subjected to a total of 32 lbs. of aromatic dibasic acids per lb. of carbon. The metals content in p.p.m. of the activated carbon was reduced as follows:

| | Metals, p.p.m. | | |
| --- | --- | --- | --- |
| | Fe | Ca | Al |
| Fresh carbon | 1,900 | 2,400 | 1,200 |
| After isophthalic acid-terephthalic acid elution | 300 | 60 | 70 |
| Percent metal removal | 84 | 97.5 | 94 |

*Example II*

A 15.0 gram sample of o-phthalic acid in 150 ml. of distilled water was heated to reflux with magnetic stirring. An 0.9008 g. sample of powdered activated carbon was added to the solution; refluxing and stirring were continued for one hour. The carbon was then filtered from the hot solution through an M porosity glass filter and washed on the filter with 35 ml. boiling water. The spent carbon was dried on the filter. Spark spectra for the carbon before and after use revealed the following:

| | Metals (p.p.m.) | | | |
| --- | --- | --- | --- | --- |
| | Fe | Na | Ca | Al |
| Fresh carbon | 1,900 | 610 | 2,400 | 1,200 |
| Treated carbon | 420 | 50 | 140 | 150 |
| Percent of metals removed | 80 | 92 | 94 | 87.5 |

*Example III*

The metals content of an activated carbon similar to that employed in Example II is treated with a solution of orthophthalic acid in 55% acetic acid (45% water), 15 parts of o-phthalic acid per 100 parts of acetic acid by weight, at the boiling point of the solution. The metals content of the activated carbon, especially the iron content, may be reduced by this process to an extent similar to that illustrated in Example II.

*Example IV*

A 15.0 gram sample of the same o-phthalic acid in solution in 150 ml. refluxing water was employed to treat 0.8970 g. activated carbon in the manner described in Example II. The iron content of the carbon before and after extraction showed the following:

Fe
Fresh carbon _____ p.p.m. __ 5800
Treated carbon _____ p.p.m. __ 250
Percent metals removal _____ percent __ 95.7

The solution of orthophthalic acid employed in Examples III and IV could be prepared from phthalic anhydride and water.

*Example V*

A carbon bed containing 100 grams of the fresh activated carbon described in Example II is flooded with an aqueous solution of trimellitic acid containing 300 parts of trimellitic acid per 100 parts water by weight at 100° C. The aqueous solution in contact with the carbon is held at 100° C. for about 24 hours and thereafter drained. The treated carbon is washed with demineralized water. By this process the metals content of the treated carbon is appreciably reduced to a level comparable to that shown in Example II.

*Example VI*

Activated carbon having an iron content of 1900 p.p.m can be treated by stirring with a glacial acetic acid solution of trimellitic acid containing 20 parts of trimellitic acid per 100 parts of solvent by weight at 125° C. for 24 hours under slight positive pressure, 5 to 6 pounds gage. The acetic acid solution is separated from the carbon and the treated carbon washed with demineralized water. An analysis of the carbon (dry) will show that by this process a reduction in iron content of 75 to 85% may be obtained.

In the foregoing processes, in place of water or acetic acid, such polar solvents as propionic acid, butyric acid, dimethyl formamide and chloro-acetic acid, among others, can be employed as solvents for the benzene polycarboxylic acids to remove metals from the activated carbons.

The following examples illustrate a commercial application of the process of this invention.

*Example VII*

Activated carbon having an iron content of about 2900 p.p.m. is charged to a vessel having external heating coils to form a 4-foot high and 1 inch in diameter bed of activated carbon for the removal of color from aqueous solutions. The vessel is then filled with an aqueous solution of o-phthalic acid at 100° C. and substantially saturated with o-phthalic acid at 100° C. The vessel is closed and the solution in the vessel is maintained at 100° C. for about 36 hours. Thereafter the solution is withdrawn and the treated activated carbon is washed by percolating demineralized water therethrough. A sample of the treated activated carbon is withdrawn, dried and its iron content determined by spark spectrum. The activated carbon so treated has a carbon content of 350 p.p.m. Hence, about 88% of the iron had been removed.

*Example VIII*

A 4-foot high bed (1 inch in diameter) of activated carbon whose iron content is about 4000 p.p.m. with a total of 61,200 p.p.m. of metals (by emission spectra) is treated with an aqueous solution containing about 7 pounds of 88% isophthalic acid and 12% terephthalic acid mixture per 100 pounds at 338° F. and a pressure to maintain the water in the liquid phase. The solution was maintained at 338 to 340° F. for 20 hours. Thereafter the solution was withdrawn and the treated bed was washed with low iron content water. The concentration of certain of the metals, in p.p.m., of the activated carbon before and after treating, as determined by emission spectra, is shown below.

| Metal | Before treatment | After treatment |
|---|---|---|
| Fe | 4,000 | 1,100 |
| Al | 13,000 | 8,000 |
| Ca | <5,000 | 175 |
| Cr | <3,500 | 300 |
| Pb | <940 | 250 |
| Mn | <230 | 100 |
| Ni | <960 | 50 |
| Si | 30,000 | 8,000 |
| V | <1,000 | 30 |

Total metals after treatment is about 18,500.

When the activated carbon described in Example VIII is employed to decolorize an aqueous solution of an 88% isophthalic acid-12% terephthalic acid mixture having an APHA Color of the triethylene glycol ester of the mixed acids of about 1100, one pound of the untreated carbon has a life of about 10 pounds of mixture treated to achieve a color of esters of treated mixed isophthalic acid and terephthalic acid of APHA 400, whereas the treated activated carbon produces a decolorized mixture of the 88% isophthalic acid and 12% terephthalic acid, whose triethylene glycol esters have an APHA Color of below 350, up to about 100 pounds of decolorized mixed acids per pound of treated activated carbon. When two beds of treated activated carbon are employed in series, a much greater decolorization life of the treated activated carbon, in the range of 300 to 400 pounds of treated mixed acids per pound of carbon, can be achieved and still produce a mixed acid product whose triethylene glycol ester product has an APHA Color of about 300. Hereinafter the color of the ester product will be referred to as TEG Color.

To pretreat the activated carbon for decolorization of mixtures of isophthalic acid and terephthalic acid it is desirable to carry out the treatment with aqueous solutions substantially saturated, 90 to 100% saturated, at the treatment temperatures which are desirably 250 to 450° F. for 1 to 72 hours and preferably 300 to 400° F. for 10 to 36 hours. These times and temperatures are for treatment with stagnant aqueous solutions. The pressure of treatment should be at least that to maintain water in the liquid phase. In the desirable range of temperatures the pressure range will be in the range of 30 to 425 pounds per square inch.

A commercial application of the process of this invention to decolorize an aqueous solution of mixed phthalic acids containing 88% isophthalic and 12% terephthalic acid is conducted in the following manner. The solution of the mixed phthalic acids is to be treated at 360° F. and 155 p.s.i.g., at a space velocity of 10 gallons per minute per square foot of cross section of the activated carbon bed. The solution contains 6.7 pounds of the mixed phthalic acids per gallon. The activated carbon after iron removal has a useful life of 300 pounds of mixed acids treated per pound of activated carbon. Two carbon treating vessels, each holding sufficient carbon for 36 hours of continuous solution, are employed in parallel arrangement. One vessel is first charged with an activated carbon having an iron content of 4000 p.p.m. To this decolorizing vessel there is charged an aqueous solution of the 88% isophthalic acid-12% terephthalic acid at 340° F. and 155 p.s.i.g. until it is filled with the solution. The solution is maintained at 340° F. and 103 p.s.i.g. for 24 hours. Thereafter the solution is drained therefrom and the carbon bed is placed on stream to decolorize the aqueous solution. The second decolorizing vessel is charged with the same type activated carbon (4000 p.p.m. Fe) and the first portion of the decolorized solution from the first decolorizer is charged to the second decolorizer until it is filled with the solution at about 340° F. and 155 p.s.i.g. Thereafter the decolorized solution from the first decolorizer is charged to a crystallization and separation system for recovery of isophthalic acid. The solution in the second decolorizer is held at 340° F. and 155 p.s.i.g. for 24 hours and then drained. When the first decolorizer has been on stream for 36 hours, the feed to it is shut off as the feed to the second decolorizer is opened. The second decolorizer is now on stream as a swing decolorizer. The first used decolorizer is now made ready to be later put on stream by removing the spent carbon, recharging with fresh carbon of 4000 p.p.m. Fe and treating with the aqueous solution of mixed phthalic acids at 340° F. and 103 p.s.i.g. for 24 hours after which it is ready to be placed on stream as a swing decolorizer.

In the foregoing manner the TEG Color of the mixed phthalic acid ester product can be reduced from about 1100 to about 400.

The treatment of the 4000 p.p.m. Fe activated carbon described above will reduce the iron content to about 1100 which is satisfactorily low for treatment of aqueous solutions of mixtures of isophthalic and terephthalic acids even though the 1100 p.p.m. Fe is too high for color removal from aqueous solutions of o-phthalic acid.

If an activated carbon of 4000 p.p.m. Fe content is to be treated to remove sufficient iron to decolorize aqueous solutions of o-phthalic acid so that the resulting solution has a color of only about 25% of the original color, two iron extractions are employed. The first extraction can be conducted at 100° C. and 5 to 10 p.s.i.g. for about 20 hours with a saturated solution of o-phthalic acid. This will bring the iron content down to 1100 to 100 p.p.m. A second treatment will bring the iron content down to the desired level. The o-phthalic acid in the treating solutions need not be discarded. Rather about 90% can be recovered by crystallization. The recovered o-phthalic anhydride will have a low iron content, about 1 to 2 p.p.m. and can be redissolved to extract additional iron from fresh activated carbon. The iron extracted by the aqueous o-phthalic acid solution remains in the mother liquor from which the o-phthalic acid was recovered by crystallization. This mother liquor can, of course, be discarded.

Although metals are added to carbons in the activation procedure to enhance the color absorptive activity of the carbon, the process of this invention does not impair the decolorization activity of the carbon even though it lowers appreciably the metals content of the treated carbon. In fact, carbon treated by the process of this invention has been observed to absorb metals from solutions of benzene polycarboxylic acids on occasions so that a very pure benzene polycarboxylic acid is obtained.

What is claimed is:

1. A process for removal of color from a solution of benzene polycarboxylic acid in a polar solvent comprising contacting said solution with a demetalized activated carbon obtained by first treating activated carbon with a solution of benzene polycarboxylic acid in a polar solvent prior to said decolorizing contacting step.

2. The process of claim 1 wherein the solution employed for said first treating of the activated carbon for metal removal is a portion of the solution to be decolorized.

3. In a process for removal of color from a phthalic acid by contacting an aqueous solution of a phthalic acid with activated carbon, the improvement which comprises first contacting the activated carbon with an aqueous solution of a phthalic acid, washing the treated activated carbon with water and thereafter contacting the activated carbon with the aqueous solution to be decolorized.

4. In a continuous process for decolorizing an aqueous solution of a phthalic acid by passing said aqueous solution through activated carbon in a decolorizing system having a first decolorizer containing activated carbon and at least one parallel connected swing decolorizer containing activated carbon to be placed on stream when the activated carbon in the first decolorizer has reached its capacity for color removal, the improved cyclic operation of alternating continuous feed of the aqueous solution of a phthalic acid to be decolorized between said first decolorizer and a swing decolorizer each of which are separately on stream by the method of: first charging said continuous feed to said first decolorizer on stream after its activated carbon has been contacted with an aqueous solution of a phthalic acid until 80 to 90 percent of iron has been removed from this activated carbon followed by draining of the contacting solution; placing in standby condition while off stream said swing decolorizer by contacting its activated carbon with an aqueous solution of a phthalic acid until 80 to 90 percent of iron has been removed from this activated carbon followed by draining of the contacting solution; changing the continuous feed from said first decolorizer when the activated carbon therein has reached its color removal capacity to said swing decolorizer in standby condition; taking said first decolorizer off stream, discharging the spent activated carbon therefrom, recharging with fresh activated carbon and placing the recharged first decolorizer in said standby condition off stream through said contacting with and draining of aqueous solution of a phthalic acid; changing the continuous feed from said on stream swing decolorizer when the activated carbon therein has reached its color removal capacity to said recharged first decolorizer in standby condition and taking said swing decolorizer off stream to discharge its spent activated carbon, recharging it with fresh activated carbon and place said recharged swing decolorizer in standby condition off stream through said contacting with and draining of aqueous solution of a phthalic acid; and repeating the steps of changing continuous feed from an on stream decolorizer to an off stream decolorizer in standby condition, taking off stream the decolorizer with spent activated carbon, discharging spent activated carbon, recharging the decolorizer now off stream with fresh activated carbon and placing the recharged decolorizer in standby condition off stream.

References Cited by the Examiner
UNITED STATES PATENTS

| | | | |
|---|---|---|---|
| 1,905,493 | 4/1933 | Palmer et al. | 260—708 X |
| 2,726,262 | 12/1955 | Grossinsky et al. | 260—525 X |
| 3,115,521 | 12/1963 | Swakon | 260—525 |

LORRAINE A. WEINBERGER, *Primary Examiner.*